May 19, 1970 J. M. MAMOULIDES ET AL 3,513,291
CONTROL SYSTEM FOR ELECTRIC WATER HEATER
Filed Aug. 3, 1966 4 Sheets-Sheet 2

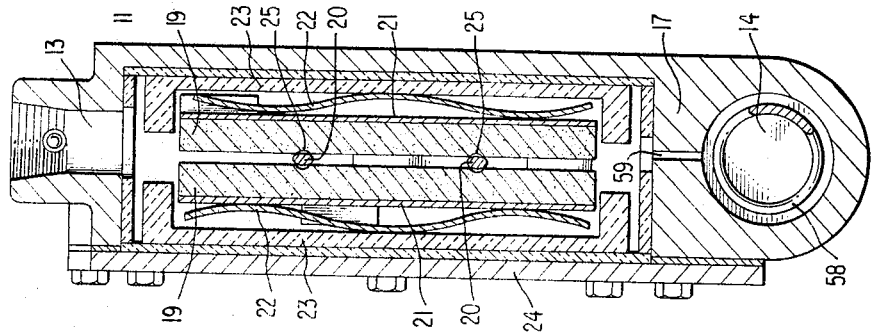
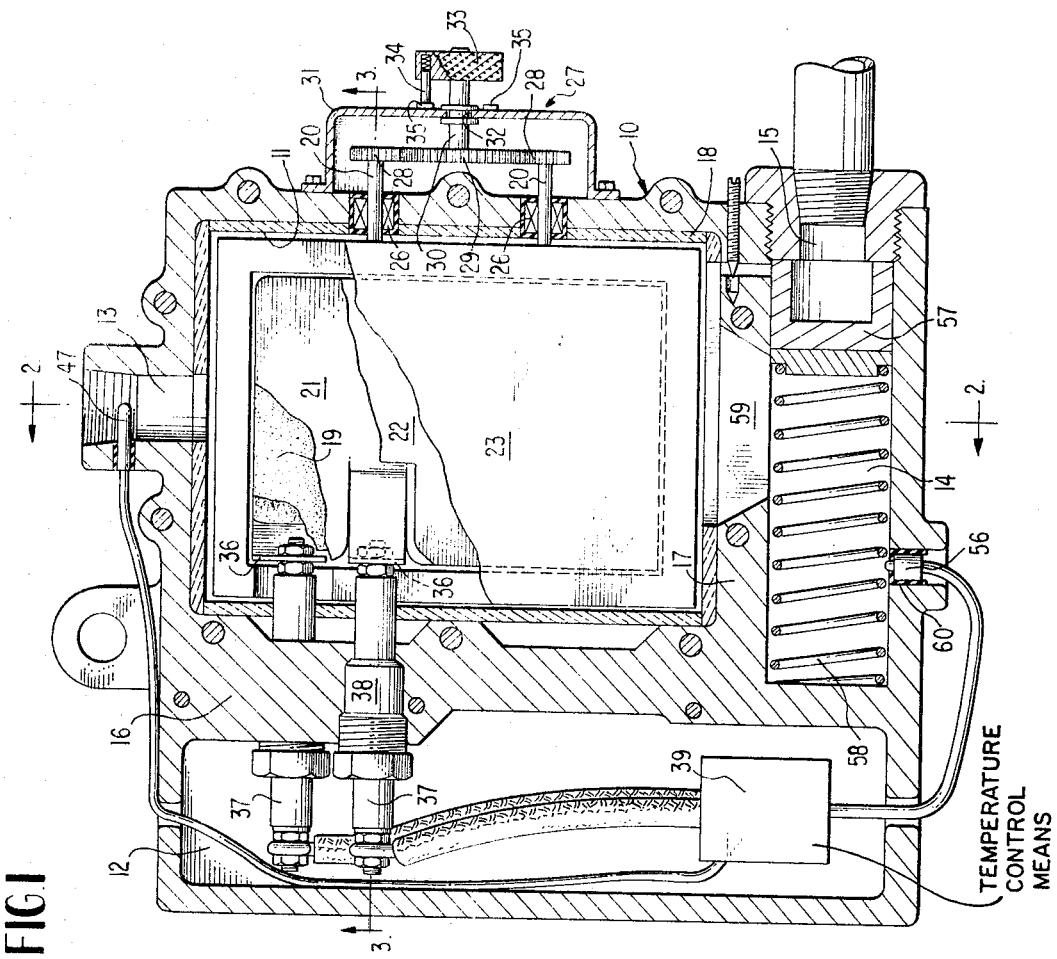

INVENTORS
JOHN M. MAMOULIDES
OREY L. RILEY
BY
Abraham A. Saffitz
ATTORNEY

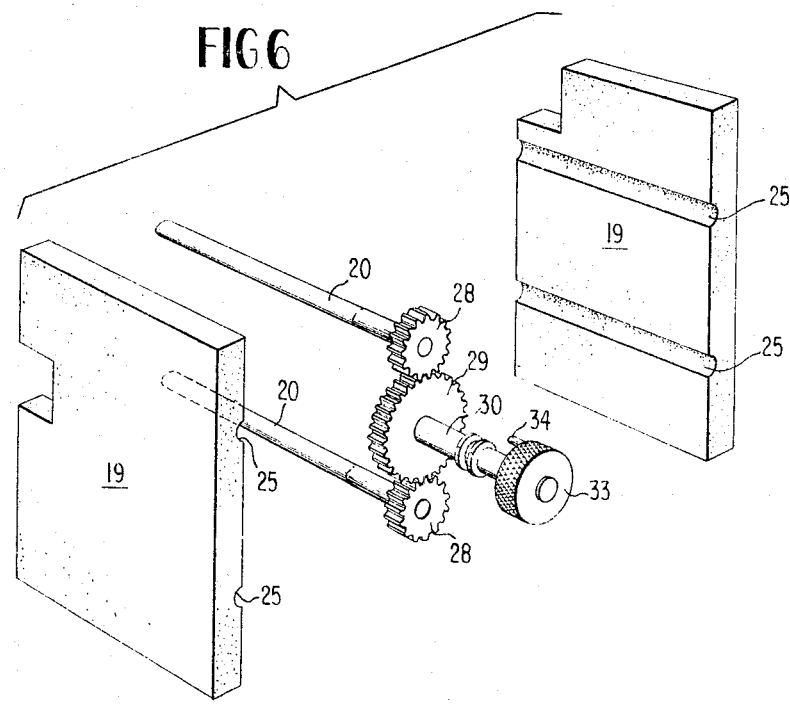
FIG. 6
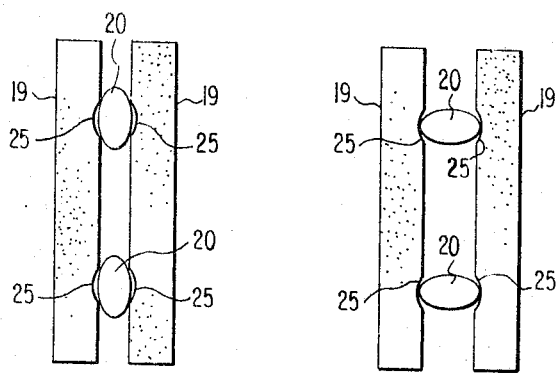
FIG. 7
FIG. 8
INVENTORS
JOHN M. MAMOULIDES
BY  OREY L. RILEY
Abraham A. Saffitz
ATTORNEY May 19, 1970  J. M. MAMOULIDES ET AL  3,513,291
CONTROL SYSTEM FOR ELECTRIC WATER HEATER
Filed Aug. 3, 1966  4 Sheets-Sheet 4

INVENTORS
JOHN M. MAMOULIDES
OREY L. RILEY
BY Abraham H. Saffitz
ATTORNEY

United States Patent Office 3,513,291
Patented May 19, 1970

3,513,291
CONTROL SYSTEM FOR ELECTRIC WATER HEATER
John M. Mamoulides, Metairie, La., and Orey L. Riley, Los Angeles, Calif., assignors to Louisiana Hydrolec, Inc., Metairie, La., a corporation of Louisiana
Filed Aug. 3, 1966, Ser. No. 569,916
Int. Cl. H05b 3/60
U.S. Cl. 219—285                                    6 Claims

ABSTRACT OF THE DISCLOSURE

An instant water heater having a heating chamber within a housing with an inlet and an outlet for water, a pair of spaced electrodes in the heating chamber which heat water which passes from the inlet to the outlet, and an externally hand-operable adjusting means including handle means projecting from the housing which means are adapted to vary the space between the electrodes, and temperature sensing means at the outlet of the heater to control the flow of current to the electrodes.

---

This invention relates to an electric water heater.

Electric water heaters of the immersed electrode type are commonly known in the trade as "instant" water heaters and are designed to heat the water as it flows through the heater. The heated water is discharged directly from the heater to the point of use, without the intermediacy of a storage tank. These "instant" heaters are intended to operate only when the water is flowing through them and, inasmuch as the rate of heat transfer is quite high, it is necessary to provide means for preventing the generation of heat during those periods when water is not flowing therethrough. Heaters of this type must also be provided with temperature control means to regulate the water temperature and the generation of steam in order to protect the apparatus and to avoid the danger of scalding or burning its users.

Water heaters operated by immersing electrical current-carrying electrodes in the water to be heated, such as shown in Grupp, U.S. Pat. No. 2,529,688, give rise to a number of problems. A major problem is in providing a means of maintaining a continuous desirable outlet water temperature over a widely varying rate of flow. An additional problem is in providing an easily adjustable means for allowing the heater to compensate for the conductivity of the water. Presently known methods for adjusting a heater to compensate for water hardness or conductivity involve removing the heater from use and completely disassembling it to make the necessary adjustments.

It is well-known that the hardness of water is due mainly to concentrations of cations of calcium, magnesium and iron, and the greater the concentration, the harder the water. The hardness of water is usually expressed in parts per million (p.p.m.) and, depending on the geographical location of the water supply, hardnesses of 10 p.p.m. to 1400 p.p.m. are known.

Since the electrical conductivity of water is proportional to the amount of dissolved ionized material in the water, it is important to the economical and efficient operation of a water heater that a simple means be provided to adjust the heater to compensate for varying water hardness and conductivity. While the term "water hardness" has been used, it will be obvious to those skilled in the art that water commonly known as "soft water" also contains concentrations of dissolved ionized material. Therefore, the electrical conductivity of soft water will also vary depending upon the percentage of dissolved ionized materials therein. Since the electrical conductivity of water is proportional to the percentage of dissolved ionized materials therein, the thermal conductivity is also proportional. This is true whether the water is of the hard or soft type. For the sake of clarity and simplicity, water having dissolved ionized materials therein will be referred to as hard water throughout the remainder of this specification.

An object of this invention is to provide an electric water heater which automatically controls the temperature of the discharge water within predetermined limits.

Another object of this invention is to provide a water heater, the heat generation of which is adjustable for varying rates of water flow.

Another object of this invention is to provide a water heater that is externally adjustable for efficiently heating water of varying hardness and conductivity.

Another object of this invention is to provide a water heater having electrical heating electrodes and a means for varying the distance between the electrodes.

Another object of this invention is to provide a water heater that will generate heat only when water is flowing therethrough.

Another object is to provide a water heater having means for varying the temperature of the discharge water.

Another object is to provide an automatic instantaneous water heater that can be connected to an existing cold water line to convert it to a hot water line or a steam generator.

Another object is to provide a water heater that is economical to manufacture and simple to service.

Another object is to provide a water heater which requires a minimum amount of electric current to achieve efficient operation.

These and other objects and novel features of the present invention will be more clearly and fully set forth in the following specification, attached drawings, and claims. A preferred embodiment of this invention of an improved water heater having a control system for regulating the temperature of the discharge water and means for compensating for water hardness and conductivity will now be described with particular reference to the accompanying drawings wherein:

FIG. 1 is a side cut away view of the heater of this invention;

FIG. 2 is a sectional view taken along line 2—2 of FIG. 1;

FIG. 6 is an exploded view of the water hardness and conductivity adjustment means of this invention;

FIG. 7 is a cut away side view showing the carbon electrodes in their closest position;

FIG. 8 is a cut away side view showing the carbon electrodes in their widest spaced position;

Figure 3:
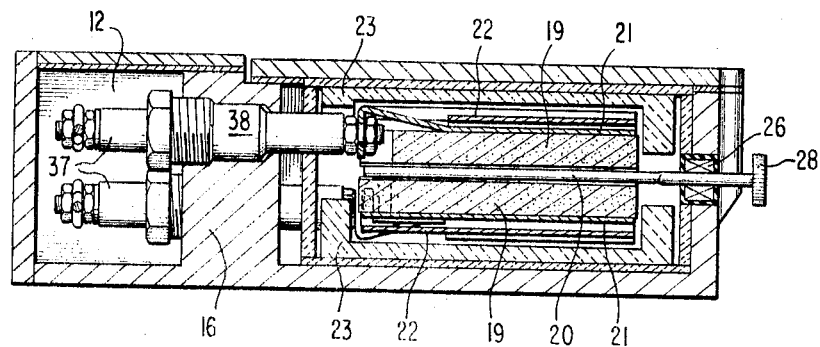
FIG. 3 is a sectional view taken along line 3—3 of FIG. 1.
Figure 4:
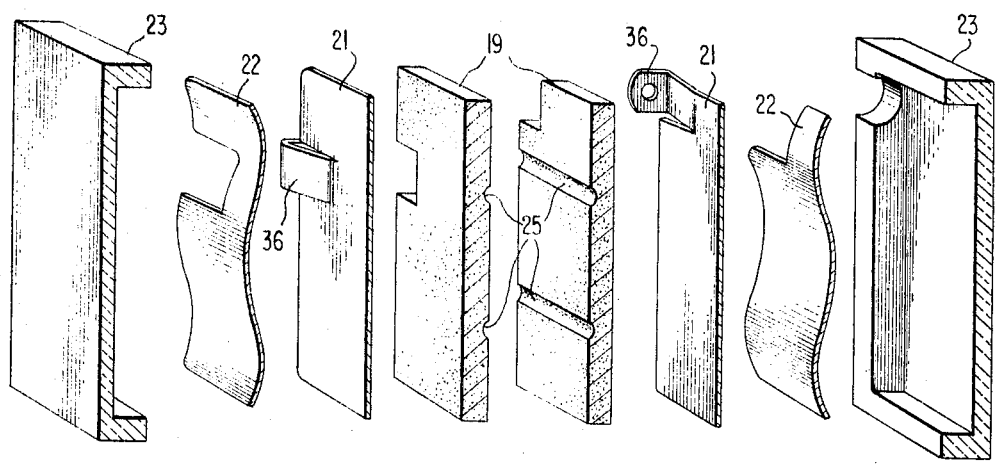
FIG. 4 is an exploded view of the heating unit of this invention.
Figure 5:
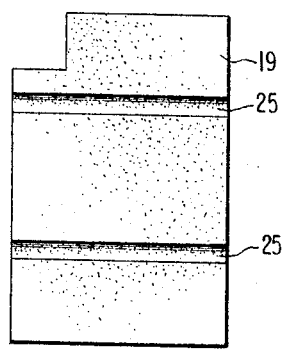
FIG. 5 is an elevational view of an electrode embodied in this invention.

Referring now to the drawings wherein like reference numbers designate like or corresponding parts throughout the several views, there is shown in FIG. 1 a heater in accordance with this invention. The heater comprises a housing 10 having a heating chamber 11, an electrical compartment 12, an outlet 13, an inlet bore 14, and an inlet opening 15. The size and shape of the housing 10 will vary depending upon its ultimate environment and desired capacity. Separating the heating chamber 11 from the electrical compartment 12 is a dividing wall 16, and separating the inlet bore 14 from the heating chamber 11 is a dividing wall 17. The internal walls of the heating chamber 11 are coated with a suitable insulation, such as a high dielectric phenolic resinoid 18 or the like, in order to reduce the electrical ground loss of the heating unit to a minimum. While many types of commercially available insulations may be used successfully, phenolic resinoid is preferred because of its high thermal shock resistance, its absence of odor and its lack of taste, all of which are of value in heating cold water for home or restaurant use.

Additionally, phenolic resinoid has substantially the same coefficient of expansion as that of brass which is the desired material for the construction of the housing 10. In view of the compatibility of expansion and retraction between the phenolic resinoid 18 and the housing 10, the phenolic resinoid 18 is substantially prevented from breaking loose from the internal walls of the housing 10 during the heating and cooling stages of the heater.

The heating chamber 11, as shown in FIGS. 1, 2 and 3, has positioned therein a pair of plate-like carbon electrodes 19. The electrodes 19 are held in adjustably spaced complementary relationship by a pair of oblong, elongated spacer rods 20. A pair of electrical contact plates 21 are positioned in juxtaposition to the outer faces of the electrodes 19. A pair of arcuate leaf springs 22 are urged into contact with the outer face of the contact plates 21 by a split ceramic casting 23. When a cover 24 is secured over the heating chamber 11, the split ceramic casting halves 23 are urged inwardly towards one another. The inward movement of the ceramic casting halves 23 compresses the springs 22 which in turn urge their respective adjacent contact plates 21 into electrical contact with the outer faces of the carbon electrodes 19. The carbon electrodes 19 are, however, held apart in spaced relationship against the force of the springs 22 by the spacer rods 20.

The spacer rods 20 are constructed from a suitable insulating material and are preferably elongated and of an oblong configuration, as shown in FIG. 6. The carbon electrodes 19 have complementary grooves 25 therein for engaging and holding the spacer rods 20 in operating position. The spacer rods 20 extend beyond the carbon electrodes 19 through an outer wall of the housing 10, and are rotatably secured thereto by a waterproof bearing 26. Fixedly secured to the outer free ends of the spacer rods 20 externally of the heating chamber 11 is a water hardness and conductivity adjusting means 27.

The water hardness and conductivity adjusting means 27 is an important aspect of this invention because the conductivity of water varies, depending upon its dissolved ionized material content. As the percentage of dissolved ionized material in the water increases, its thermal conductivity increases. Therefore, the temperature of the water being heated cannot efficiently be controlled unless some means are provided for adjusting the heater for varying water hardness and conductivity. This is particularly important if it is desired to produce a single heating unit to be used in all geographical locations. As mentioned hereinbefore, the hardness of the water to be heated can vary from 10 p.p.m. to 1400 p.p.m., depending upon the source of the water supply. It has been determined that the most effective method of adjusting the heating unit to efficiently and accurately heat the various types of water is to provide a means for adjusting the space between the carbon electrodes 19. The water hardness adjusting means 27 provides this adjustment and comprises a pair of identical gears 28 secured to the free outer ends of the spacer rods 20. The gears 28 are engaged and rotatably driven by an interconnecting gear 29 which has a drive shaft 30 extending outwardly therefrom. A cover 31 is secured to the outer wall of the housing 10, adjacent the gears 28 and 29, and in encompassing relationship thereto. The cover 31 has a journaled aperture 32 therein through which the outer free end of the drive shaft 30 extends. A knob 33 for manually rotating the drive shaft 30 is fixedly secured to the outer free end thereof, externally of the cover 31 in adjacent relationship thereto. The knob 33 is provided with a spring loaded indicating and backlash preventing means 34. Mounted on the cover 31, in complementary relationship to the indicating and backlash preventing means 34, are a plurality of water hardness indicating numbers 35.

In operation, the knob 33 is rotated until the indicating means 34 is directly opposite to and in engagement with the desired water hardness indicating number 35. The pressure exerted on the indicating and backlash preventing means 34 by a spring forces the indicating means 34 into frictional engagement with the indicating numbers 35 on the cover 31, thereby providing a predetermined resistance to movement of the knob 33 and preventing an accidental change of the hardness setting during operation. The frictional resistance is desirable in order to circumvent an accidental change in the water hardness setting due to vibration or other external unsettling forces. As the knob 33 is rotated so that the indicating means 34 can select the correct water hardness number, the drive shaft 30 and its associated gear train produce a rotational force on the spacer rods 20. In view of the oblong cross sectional shape of the spacer rods 20, as shown in FIG. 6, the rotation of the spacer rods 20 within the grooves 25 between the carbon electrodes 19 causes the space between the electrodes to change in accordance with the abutting diameter of the spacer rods 20. By manual adjustment of the water hardness adjusting means 27, the space between the carbon electrodes 19 can be easily and quickly converted for the proper heating of water of varying mineral content and conductivity. It is desirable, in allowing the carbon electrodes 19 to be variably spaced in relation to each other, that the leaf springs 22 exert a sufficient inward force on the electrodes 19 to enable them to grip the spacer rods 20 securely, while allowing them to be urged apart by the turning action of the spacer rods 20. The amount of pressure that the springs 22 should exert on the carbon electrode 19 is dependent upon the electrode's size and composition. However, undue stress on the electrode 19 should be avoided in order to minimize the possibility of the electrode 19 cracking and distorting.

Figure 11:
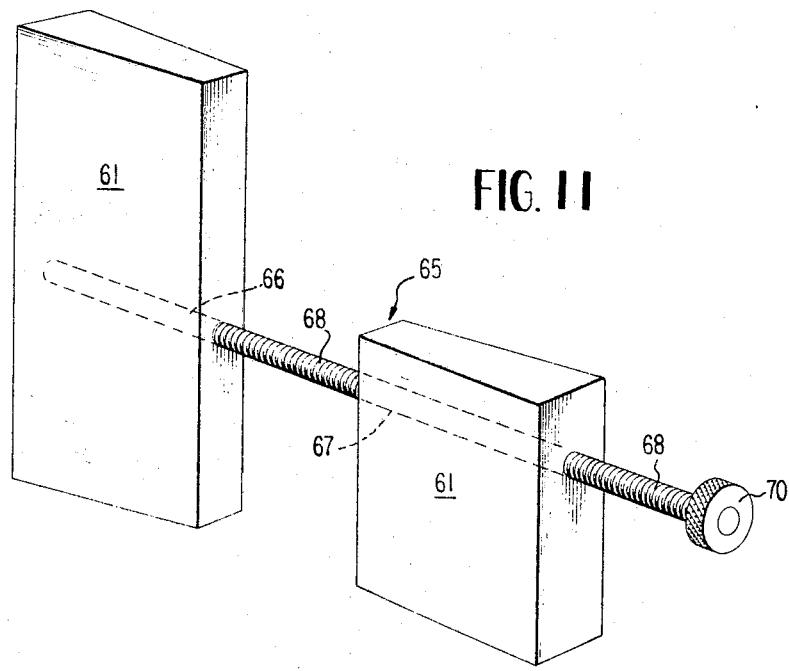
FIG. 11 is an exploded view of an alternate embodiment of the water hardness and conductivity adjustment means of this invention.
Figure 9:
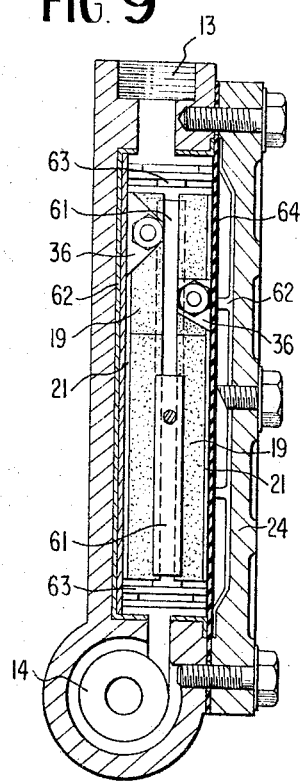
FIG. 9 is a sectional side view of an alternate embodiment of this invention.
Figure 10:
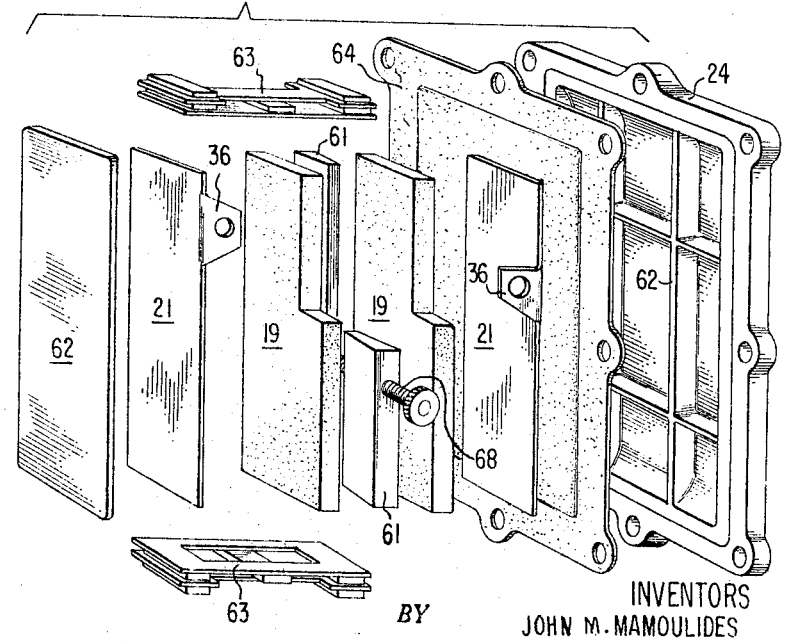
FIG. 10 is an exploded view of the heating unit of the alternate embodiment of this invention.

FIGS. 9–11 show an alternate embodiment of this invention wherein the plate-like carbon electrodes 19 are held in adjustably spaced relationship by a ceramic wedge 61. A pair of electrical contact plates 21 are positioned in juxta-position to the outer surfaces of the electrodes 19. In order to reduce the electrical ground loss the internal walls of the heating chamber 11 and the cover 24 are coated with a thick lining of phenolic resinoid 62 or a similar suitable insulation. Additionally, mounted above and below the upper and lower edges of the carbon electrodes 19, adjacent the inlet bore 14 and the outlet 13 is a spaced phenolic resinoid insert 63. The phenolic resinoid insert 63 allows water to pass through it while preventing the electrodes 19 from coming into contact with the housing 10. Before the cover 24 is secured over the heating chamber 11, a rubber gasket 64 or the like is inserted between the cover 24 and the heating chamber 11. When the cover 24 is secured over the heating chamber 11, the contact plates 21 are urged into electrical contact with the outer surface of the carbon electrodes 19. The carbon electrodes 19, however, are held apart in spaced relationship against the force of the phenolic resinoid lined cover 24 and the rubber gasket 64 by the ceramic wedge 61. It is the compressibility and resiliency of the gasket 64 which allows the space separating the carbon electrodes 19 to be varied in a manner hereinafter described.

While a ceramic wedge 61 has been specified for holding the carbon electrodes in spaced relationship, it will be obvious to those skilled in the art that the wedge 61 can be constructed from a number of commercially available insulating materials other than ceramic. However for the sake of clarity a ceramic wedge will be utilized for descriptive purposes.

A water hardness and conductivity adjustment means 65 is shown in FIGS. 10 and 11, wherein a wedge 61 is placed adjacent each side of the electrodes 19 with the points of the wedges, between the electrodes, facing each other. The wedge 61 on one side of the electrodes 19 has a left hand threaded orifice 66 therein. The wedge 61 on the opposite side of the electrodes 19 has a right hand threaded orifice 67 in coaxial alignment with the orifice 66. A shaft 68 threadedly connects the orifices 66 and 67 and extends through an outer wall of the housing 10, and is rotatably secured thereto by a waterproof bearing. Secured to the outer free end of the threaded shaft 68 is a knob 70.

In operation, the knob 70 is turned thereby causing the shaft 68 to rotate. Because the wedges 61 have oppositely threaded orifices 66 and 67 therein and are interconnected by the threaded shaft 68 rotating the shaft in a clockwise and counterclockwise direction will cause the wedges 61 to move towards and away from each other. When the shaft 68 is rotated in a direction to cause the wedges 61 to move towards each other the carbon electrodes 19 are forced apart by the consequent wedging action, thereby compressing the rubber gasket 64.

While two specific methods of varying the space between the carbon electrodes 19 have been described in detail, it is obvious that there are many other analogous methods of accomplishing the same result and the methods described are meant to be descriptive in order to give a full and complete understanding of this invention.

The contact plates 21, which are in electrical contact with the outer face of the carbon electrodes 19 have a laterally extending terminal strip 36. The terminal strips 36 are adapted to electrically contact a pair of electric plugs 37 which extend through the dividing wall 16 and are electrically insulated therefrom by a dielectric sleeve 38 which surrounds an intermediate portion of the electric plug 37. The dielectric sleeve 38 may be constructed of porcelain, phenolic resinoid or any other suitable dielectric insulation material capable of withstanding the heat. The electric plug 37 is mounted in the dividing wall 16 in a manner so as to insure a water-tight connection in addition to its electrical insulation.

The temperature control means 39 is electrically connected to an on-off switch means 56, such as a microswitch. The switch means 56 is actuated by the flow of water into the heating chamber 11 in a manner hereinafter described. In order to energize or de-energize the heating unit in response to a demand for hot water, a piston 57 is located within the inlet bore 14. The piston 57 is preferably of the free floating type and is biased outwardly towards the inlet opening 15 by a spring 58. In operation, when water flows from the inlet opening 15 into the inlet bore 14, the pressure of the water urges the piston 57 against the tension of the spring 58 sufficiently inwardly through the bore 14 to permit the passage of water from the inlet bore 14 to the heating chamber 11 through a passageway 59. The passageway 59 is located in the dividing wall 17 between the heating chamber 11 and the inlet bore 14, and thereby insures that the chamber 11 and the bore 14 are in constant communication. Since the piston 57 is appreciably shorter than the passageway 59, water pressures on opposite sides of the piston will readily balance each other when the outlet 13 is closed, and the piston 57 will quickly respond to a drop in pressure in the heating chamber 11 when the outlet 13 is opened. Therefore, with the outlet 13 closed, the force of the incoming water will cause the piston 57 to move inwardly in the inlet bore 14, and the piston 57 will travel a limited distance against the face of the spring 58 before the water will flow around the piston 57 by way of the passageway 59. When the pressure on both sides of the piston 57 equalizes the piston will reach a state of equilibrium and remain in a static condition. If the outlet 13 is opened, the water passing through the passageway 59 will continue through the heating chamber 11 and discharge through the outlet 13. Because the water is allowed to discharge through the outlet 13, the pressure on the inward or back side of the piston 57 will not equal the inlet pressure of the water and the piston 57 will continue to move inwardly until the compressive force of the spring 58 equals the inlet pressure of the water. When the outlet 13 is open, the piston 57 will travel inwardly a sufficient distance to actuate the switch means 57 which is mounted in an aperture 60 located in the external wall of the inlet bore 14. The switch means 56 is secured within the aperture 60 by means of a water-tight insulating bushing. The actuation of the switch means 56 by the piston 57 allows current to flow to the temperature control means 39 and consequently to the electric plugs 37 and the carbon electrodes 19, thereby heating the water flowing through the heating chamber 11 to the outlet 13. When the outlet 13 is closed or the water supply turned off, the force of the spring 58 urges the piston 57 outwardly towards the inlet opening 15 and consequently back over the switch means 56 which shuts off, stopping the flow of current to the temperature control means 39 and de-energizing the heating unit.

During the time of water flow through the heating chamber 11, the water comes into direct contact with the carbon electrodes 19, and after being heated thereby is discharged through the outlet 13. The water which is discharged through the outlet 13 is maintained at a predetermined temperature by the temperature control means 39. In order to determine the temperature of the outlet water, the temperature-sensing means 47 senses the temperature of the outlet water and relays an indicating signal to the temperature control means 39, which regulates the heat output of the heating unit.

It will be obvious to those skilled in the art that while a preferred embodiment has been described in detail, the temperature sensing and control means can be any one of many known to those skilled in the art, and it is to be understood that modifications, such as the use of special high temperature heating fluids, e.g. Prestone-water mixtures, etc. (Prestone is defined at page 903 of "The Condensed Chemical Dictionary," Reinhold Publishing Company 1965, as a trademark of Union Carbide and Carbon Corporation useful in cooling and radiant heating system), may be made without departing from the spirit and scope of the invention as defined in the claims which follow.

We claim:

1. An instant water heater having a heating chamber within a housing with an inlet and an outlet for water; a pair of spaced electrodes in said heating chamber for heating water as it passes through said chamber from said inlet to said outlet, said electrodes being spring biased toward each other and having groove means in opposed faces thereof; a rotatable spacer rod having an elliptical transverse cross section mounted between said electrodes in abutting complementary contact with said groove means; means for rotating said spacer rod about its longitudinal axis, said means including handle means projecting from said housing whereby said space between said electrodes is varied in accordance with the abutting diameter of said spacer rod; a temperature sensing means located in said outlet; and a temperature control means adapted to conduct the current to said electrodes in accordance with water temperature sensed by said temperature sensing means.

2. An instant water heater in accordance with claim 1 wherein a gear train is provided which is driven by said handle means to rotate said spacer rod, whereby the space between said electrodes is varied in accordance with the diameter of said spacer rod.

3. An instant water heater in accordance with claim 2 wherein said groove means are located in the inner face of each of the electrodes for retaining said spacer rod in complementary abutting relationship to said electrodes.

4. An instant water heater having a heating chamber within a housing with an inlet and an outlet; a pair of spaced electrodes in said heating chamber for heating water as it passes through said chamber from said inlet to said outlet, said electrodes having groove means in adjacent faces thereof; a rotatable spacer rod having an elliptical transverse cross section mounted between said electrodes to abut said groove means; means to rotate said spacer rod to thereby vary the space between the electrodes; a temperature sensing means located at said outlet which emits an electrical signal to a temperature control means which is indicative of the temperature at said outlet; and a temperature control means which energizes the electrodes to cause heating of the water when the temperature is below a predetermined temperature setting and to deenergize said electrodes when the temperature is above the predetermined temperature setting.

5. An instant water heater in accordance with claim 4 wherein said housing is made of brass and said heating chamber is coated with a phenolic resinoid, the phenolic resinoid having a coefficient of expansion comparable to that of the brass to withstand sharp changes in temperature and said electrodes are formed of carbon conductive material.

6. An instant water heater in accordance with claim 4, further including a switch means for energizing or de-energizing said electrodes, a piston mounted in said inlet, said switch means mounted in said inlet of said heating chamber for actuation by said piston, said piston being responsive to the flow of water through said heating chamber, whereby said piston actuates said switch means when the water is flowing through said heating chamber and discharging through said outlet.

References Cited

UNITED STATES PATENTS

| 2,529,688 | 11/1950 | Grupp | 219—295 |
| 2,584,654 | 2/1952 | Alden | 219—285 |
| 2,757,272 | 7/1956 | Santoni | 219—285 |
| 2,788,428 | 4/1957 | Bremer | 219—285 |
| 2,807,702 | 9/1957 | Gomez | 219—291 |
| 3,105,894 | 10/1963 | Matz et al. | 219—288 X |
| 3,149,224 | 9/1964 | Horne et al. | 219—501 X |
| 3,240,948 | 3/1966 | Burley | 219—499 X |
| 3,337,792 | 8/1967 | Engelson. | |

FOREIGN PATENTS 659,352  10/1951  Great Britain.

ANTHONY BARTIS, Primary Examiner

U.S. Cl. X.R.

219—293, 295, 309, 331